United States Patent [19]
Aomori et al.

[11] Patent Number: 6,069,674
[45] Date of Patent: *May 30, 2000

[54] LIQUID CRYSTAL DISPLAY APPARATUS

[75] Inventors: Shigeru Aomori, Abiko; Yoshiki Nakatani, Kashiwa, both of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/649,298

[22] Filed: May 17, 1996

[30] Foreign Application Priority Data

May 19, 1995 [JP] Japan ................................. 7-121925

[51] Int. Cl.$^7$ ........................... G02F 1/135; G02F 1/1335
[52] U.S. Cl. ............................. 349/12; 349/28; 349/110; 345/81
[58] Field of Search ................... 349/12, 24, 28, 349/110, 116; 345/81, 104, 179

[56] References Cited

U.S. PATENT DOCUMENTS

| | | | |
|---|---|---|---|
| 4,093,357 | 6/1978 | Jacobson et al. | 349/30 |
| 4,191,452 | 3/1980 | Grinberg et al. | 349/28 |
| 4,227,201 | 10/1980 | Grinberg et al. | 349/28 |
| 4,654,649 | 3/1987 | Kojima et al. | 340/719 |
| 4,875,036 | 10/1989 | Washizuka et al. | 345/104 |
| 5,076,670 | 12/1991 | Sayyah | 349/116 |
| 5,210,433 | 5/1993 | Ohsawa et al. | 349/27 |
| 5,227,886 | 7/1993 | Efron et al. | 349/24 |
| 5,408,345 | 4/1995 | Mitsui et al. | 349/42 |
| 5,430,462 | 7/1995 | Katagiri et al. | 345/104 |
| 5,446,564 | 8/1995 | Mawatari et al. | 349/116 |

FOREIGN PATENT DOCUMENTS

| | | |
|---|---|---|
| 6-75238 | 3/1994 | Japan . |
| 7-28095 | 1/1995 | Japan . |

OTHER PUBLICATIONS

J. P. Salerno et al. "5.7: Late news Paper: Single–Crystal Silicon Transmissive AMLCD" *SID 92 Digest*, pp. 63–66, 1992.

*Primary Examiner*—William L. Sikes
*Assistant Examiner*—Toan Ton
*Attorney, Agent, or Firm*—Dike, Bronstein, Roberts & Cushman, LLP; David G. Conlin; William J. Daley, Jr.

[57] ABSTRACT

The liquid crystal display apparatus of the invention includes a device-formed substrate, a counter substrate, and a liquid crystal layer interposed therebetween. The device-formed substrate includes: a plurality of display electrodes for applying display voltages to the liquid crystal layer; a plurality of active devices for supplying the display voltages to the plurality of display electrodes, respectively; and image inputting devices for inputting an image. In the liquid crystal display apparatus, image processing means is provided for processing the image input by the image inputting devices.

20 Claims, 10 Drawing Sheets

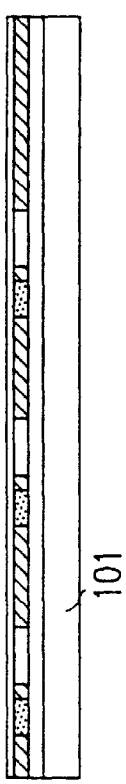
FIG.7D
FIG.7E
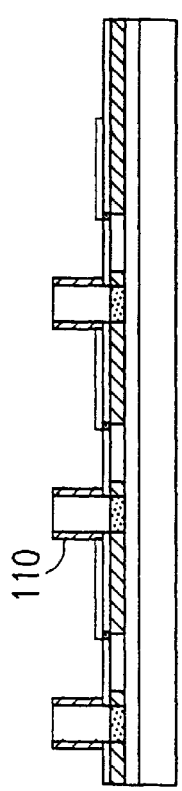
FIG.7F
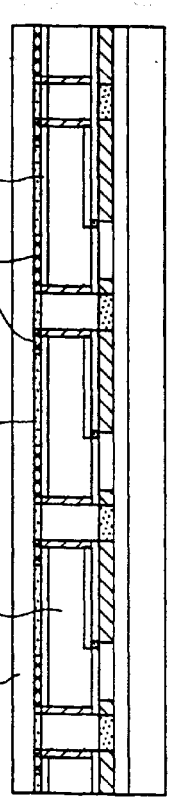
FIG.7G
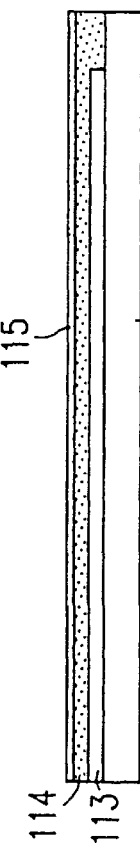
FIG.7A
FIG.7B
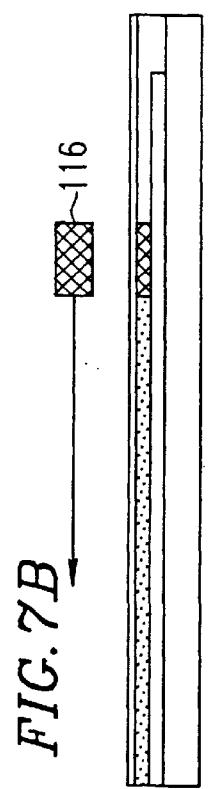
FIG.7C
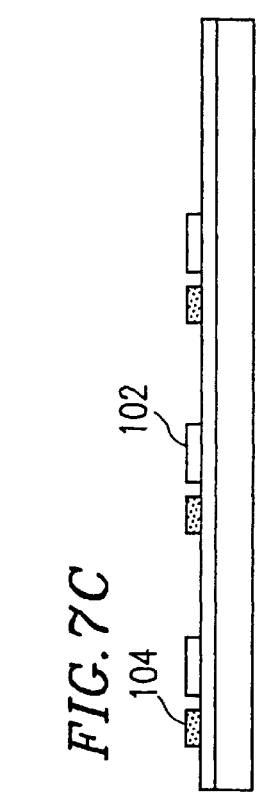

LIQUID CRYSTAL DISPLAY APPARATUS

BACKGROUND OF THE INVENTION

1. Field of the Invention

The present invention relates to a liquid crystal display device that can be used in bidirectional image communication devices such as a TV phone, portable information terminal devices and various other types of video devices.

2. Description of the Related Art

In recent years, remarkable development of information communication networks has increased the necessity to develop bidirectional multi-media information communication devices for bidirectionally communicating image information such as motion pictures, still pictures and the like in addition to conventional information transmissions using sounds and characters. Various communication devices like TV phones have conventionally been used to bidirectionally communicate image information and audio information. Recently, it has become increasingly more common to transmit and receive via telephone lines video information recorded by a video camera.

However, such communication devices for bidirectionally communicating image information have the following problems. In bidirectionally communicating information using a conventional bidirectional image communication device such as a TV phone or the like, a user's eyes are directed to an image display section of the image communication device in which the image transmitted from the counterpart is displayed, however a camera section for capturing an image of the user cannot be disposed in a direction in which the user's eyes are directed. Therefore, the conventional bidirectional image communication device cannot present an image of one user in which the direction of his eyes coincides with the direction of the eyes of the other user.

In addition, in the case where an image input device which is generally used as a home-use video device is employed as a camera section for a bidirectionally image communication device, it is difficult to reduce the size of the image communication device. More specifically, as shown in FIG. 10, the above-mentioned image input device includes an optical system including: a lens 1; an iris 2; an IR cut filter 3; an optical lowpass filter 4; and a color filter 5, a charge coupled device (CCD) 6 and a signal/image processor 7 connected to the CCD 6. The color filter 5 is provided on the CCD 6. This image input device obtains color image information by reducing the size of an image entering from the lens 1 and projecting the image onto the CCD 6. Consequently, the optical system is indispensable to this image input device. However, in the case where this image input device is incorporated into a communication device, the optical system serves as a significant and undesirable obstacle to size reduction of the communication device.

In order to overcome the above-mentioned problems, Japanese Laid-Open Patent Publication No. 7-28095 discloses a liquid crystal display apparatus having image input devices. In the liquid crystal display apparatus, active devices used as switching devices for driving pixels are provided on one substrate, while the image input devices (each of which includes a photodiode and a MOS transistor) are provided on the other substrate, i.e., a counter substrate. However, in this liquid crystal display apparatus, it is necessary to use a transparent substrate as the counter substrate. When a glass substrate is used, the temperature in the fabrication process of the image input devices is limited to the upper limit of the heat-resistance of the glass substrate. This makes it difficult to form high performance image input devices on glass substrates. Alternatively, when a quartz substrate which is transparent and has a higher upper limit of heat-resistance is used, the temperature of the fabrication process of the image input devices is not limited. However, the quartz substrate increases the production cost of the entire liquid crystal display apparatus.

SUMMARY OF THE INVENTION

The liquid crystal display apparatus of the invention includes: a device-formed substrate; a counter substrate; and a liquid crystal layer interposed therebetween. The device-formed substrate includes: a plurality of display electrodes for applying display voltages to the liquid crystal layer; a plurality of active devices for supplying the display voltages to the plurality of display electrodes, respectively; and image inputting devices for inputting an image. In the liquid crystal display apparatus, image processing means is provided for processing the image input by the image inputting devices.

In one embodiment, the image inputting devices include light receiving portions and charge coupled devices electrically connected to the light receiving portions, respectively, the light receiving portions being arranged to be located in the vicinity of the display electrodes.

In another embodiment, the device-formed substrate includes a substrate on which the active devices, the image inputting devices and the image processing means are disposed and an insulating film formed on the active devices, the image inputting devices and the image processing means, and the display electrodes and the light receiving portions of the image inputting devices are disposed on the insulating film and are connected to the active devices and the charge coupled devices through contact holes provided in the insulating film.

In still another embodiment, the plurality of display electrodes are arranged in a matrix, and the counter substrate includes a further substrate, a counter electrode formed on the further substrate, and a black matrix disposed on a portion of the further substrate which corresponds to a portion between the display electrodes, the black matrix having openings, the light receiving devices being arranged to align with the openings of the black matrix.

In still another embodiment, the liquid crystal apparatus further includes cylindrical members disposed between the openings and the light receiving devices, each of the cylindrical members being a hollow member having a wall-portion formed of a light absorbing material.

In still another embodiment, the counter substrate further includes a color filter, part of the color filter being formed in the openings of the black matrix.

In still another embodiment, the device-formed substrate includes a semiconductor substrate, and at least the active devices and the image inputting devices are disposed on the semiconductor substrate.

In still another embodiment, the device-formed substrate includes a semiconductor substrate, and a driving circuit is provided for supplying the display voltages to the active devices on the semiconductor substrate.

In still another embodiment, the plurality of display electrodes are reflective electrodes formed of a light-reflective material, and the image processing means are disposed on the device-formed substrate.

In still another embodiment, the device-formed substrate includes a transparent substrate, the active devices and the image inputting devices are disposed on the light transmissive substrate, and the plurality of display electrodes are formed of a transparent material.

In still another embodiment, the liquid crystal display apparatus further includes a backlight disposed on a side of the device-formed substrate opposite to the liquid crystal layer, and the image processing means are formed on the device-formed substrate.

In still another embodiment, the image inputting devices are semiconductor devices which are fabricated on a semiconductor substrate and are then transferred on the transparent substrate.

According to yet another aspect of the present invention, a method of fabricating a liquid crystal display apparatus is provided. The liquid crystal display apparatus includes: a device-formed substrate and a counter substrate arranged to oppose each other; a liquid crystal layer interposed between the device-formed substrate and the counter substrate; image inputting devices for inputting an image; and image processing means for processing the input image. The method includes the steps of: fabricating the device-formed substrate by forming, on a substrate, a plurality of display electrodes for applying display voltages to the liquid crystal layer, a plurality of active devices for supplying the display voltages to the plurality of display electrodes, respectively, and the image inputting devices; and forming the liquid crystal layer by filling a gap between the device-formed substrate and the counter substrate with a liquid crystal material after making the device-formed substrate and the counter substrate adhering to each other.

In one embodiment, the substrate of the device-formed substrate is a transparent substrate, and the fabrication step of the device-formed substrate includes the steps of: forming the image inputting devices on a semiconductor substrate; and transferring the formed image inputting devices onto the transparent substrate.

In another embodiment, the fabrication step of the device-formed substrate further includes the steps of: forming the active devices, the image processing means and a driving circuit for supplying the display voltages to the active devices on the semiconductor substrate; and transferring the active devices, the image processing means and the driving circuit from the semiconductor substrate onto the transparent substrate.

In still another embodiment, the method of fabricating a liquid crystal display apparatus further includes a step of fabricating the counter substrate by forming a counter electrode and a black matrix on a further substrate. In this method, the black matrix has openings and is arranged to be located on a portion of the further substrate corresponding to a portion between the display electrodes on the device-formed substrate, at least part of the image inputting devices being disposed to correspond to the openings.

In still another embodiment, the fabrication step of the counter substrate includes a step of forming a color filter on the further substrate, a portion of the color filter being arranged to be located within the openings of the black matrix.

In still another embodiment, the image inputting devices include light receiving portions and charge coupled devices electrically connected to the light receiving portions, respectively, at least the light receiving portions being arranged to correspond to the openings of the black matrix.

In still another embodiment, the method of fabricating a liquid crystal display apparatus further includes a step of providing hollow cylindrical members having wall portions formed of a light absorbing material to be located between at least part of the image inputting devices and the openings of the black matrix.

In still another embodiment, the substrate of the device-formed substrate is a semiconductor substrate, and the fabrication step of the device-formed substrate includes a step of forming the active devices and at least portions of the image inputting devices on the semiconductor substrate.

In still another embodiment, the fabrication step of the device-formed substrate further includes a step of forming the image processing means and a driver circuit for supplying the display voltages to the active devices on the semiconductor substrate.

In a liquid crystal display apparatus of the present invention, at least one image input device is provided in an image display section. Therefore, when the liquid crystal display apparatus is used in bidirectional communication while it is incorporated in, for example, a TV phone, the user can view the displayed image of the other user in which the direction of the eyes of the other user coincides with the viewing direction.

In addition, by using charge coupled devices and photodiodes as image input devices and providing the image input devices and the image processing sections thereof on the substrate on which active devices for driving pixels are provided, the entire portion of the display screen can also be used as an image input section. As a result, it is no longer necessary to use an optical system for reducing the size of an input image and projecting the image onto detection devices unlike a conventional camera, and integration of an image display device and an image input device can be realized. Therefore, according to the present invention, a smaller-sized portable bidirectional image communication device can be fabricated. Also, it is possible to simplify the production process thereof.

Moreover, by providing image inputting openings in a black matrix disposed to correspond to a portion between adjacent pixels, the image input devices can be disposed within the display screen without adversely affecting the display on the screen.

Furthermore, by interposing a cylindrical member made of a light absorbing material between each image inputting opening and a corresponding image input device, all the incoming light except for components entering perpendicularly to the image input device is absorbed without being scattered so that the image input device can receive only the components of the incoming light perpendicular thereto. As a result, a signal having a satisfactory signal/noise (S/N) ratio can be obtained.

In addition, by extending a color filter having filter portions of different colors so that one filter portion be located in one image inputting opening, an optical signal corresponding to the color of the filter portion can be input to the image input device located below the image inputting opening.

Moreover, by using a semiconductor substrate in the device-formed substrate, the active devices and the image input devices can be easily fabricated by utilizing an LSI process, thereby improving the reliability.

Furthermore, by fabricating the image input devices on a semiconductor substrate which is not used in the liquid crystal display apparatus and then transferring the image input devices onto a substrate of the liquid crystal display apparatus, an LSI process can be applied to fabrication of the image input devices, leading to improve the performance and the reliability of the image input devices with a high production yield.

Thus, the invention described herein makes possible the advantage of providing a liquid crystal display apparatus which can input an image through an image display section, can be formed in a smaller size and can display an image of a user in which the direction of eyes of the user coincides with the direction of eyes of the other user who views the displayed image.

This and other advantages of the present invention will become apparent to those skilled in the art upon reading and understanding the following detailed description with reference to the accompanying Figures.

BRIEF DESCRIPTION OF THE DRAWINGS

FIGS. 7A, 7B, 7C, 7D, 7E, 7F and 7G are cross-sectional views sequentially illustrating the process steps for fabricating the reflective color liquid crystal display apparatus illustrated in FIG. 6.

DESCRIPTION OF THE PREFERRED EMBODIMENTS

Hereinafter, the present invention will be described by way of illustrative examples with reference to the accompanying drawings. It is noted that the present invention is not limited to the following examples.

EXAMPLE 1

Figure 1:
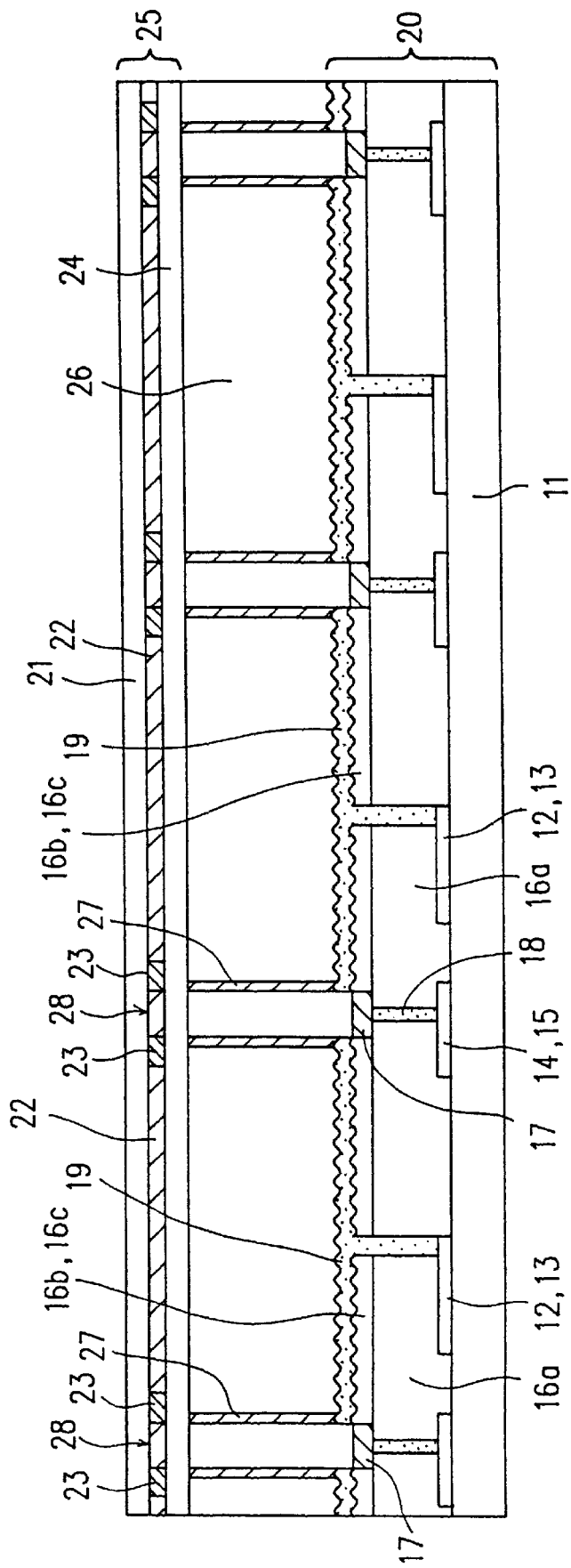
FIG. 1 is cross-sectional view of a reflective color crystal display apparatus according to the present invention.

FIG. 1 is a cross-sectional view of a reflective color liquid crystal display apparatus according to an example of the present invention.

The liquid crystal display apparatus includes a device-formed substrate 20, a counter substrate 25 and a liquid crystal layer 26 interposed therebetween. In the liquid crystal display apparatus, a plurality of pixels are arranged in a matrix and constitute a display screen. As shown in FIG. 1, a plurality of liquid crystal driving sections, each consisting of an active device 12 and a driver 13, and a plurality of image processing sections, each consisting of a shift register 14 constituted by a CCD which is a part of an image input device and an image processor 15, are formed on a semiconductor substrate 11 made of silicon (Si), for example. Interlevel insulating films 16a, 16b and 16c are provided over these devices. In this example, one liquid crystal driving section and one image processing section are provided for each pixel in the display screen. The liquid crystal driving section is provided in a corresponding pixel, whereas the image processing section is provided between the corresponding pixel and an adjacent pixel.

A photodiode 17 functioning as a photosensitive section for the CCD is formed above the CCD shift register 14 and the image processor 15. That is, the photodiode 17 is also located between the corresponding pixel and the adjacent pixel. The photodiode 17 together with the CCD shift register 14 constitute the image input device. The photodiode 17 is connected with the CCD shift register 14 via a signal line 18. In addition, a reflective electrode 19 for applying a display voltage to a liquid crystal layer 26 of each pixel is formed above each liquid crystal driving section via the interlevel insulating films 16a to 16c. The reflective electrode 19 is connected with the active device 12 of the liquid crystal driving section. On the reflective electrode 19, an alignment film (not shown) is provided. The device-formed substrate 20 is configured to include the above-described components arranged in this manner.

The counter substrate 25 includes a transparent insulating substrate 21 on which a color filter 22 having filter portions of different colors and a black matrix 23 formed of a light absorbing material are provided. The black matrix 23 is provided in gaps between the pixels, and therefore is located above the photodiodes 17. Thus, in order to allow light to be incident on the photodiodes 17, image inputting openings 28 are provided in the black matrix 23. The openings 28 are arranged to be aligned with the photodiodes 17.

On the color filter 22 and the black matrix 23, a counter electrode 24, which is formed of a transparent conductive material and an alignment film (not shown) are provided, in that order. The device-formed substrate 20 and the counter substrate 25 are disposed so that the alignment films (not shown) of the substrates 20 and 25 inwardly face each other. The liquid crystal layer 26 is sandwiched between these alignment films (not shown).

A pillar 27, which is a cylindrical member having a wall portion made of a polymer material or the like, is formed above each photodiode 17 located under the black matrix 23. The inside of the pillar 27 is hollow and is used as a passageway for light, so that image light entering the pillar 27 through the corresponding opening 28 can be incident onto the photodiode 17 functioning as a photosensitive section of the image input device.

The polymer material of the wall portion of the pillar 27 is preferably a light absorbing polymer material which can prevent light from scattering. In the present example, a polymer material mixed with a black pigment is used. Such a material is used for a black matrix made of resin. By using the light absorbing material for the wall portion of the pillar 27, the scattering of light entering the inside of the pillar 27 can be suppressed. As a result, only light entering the inside of the pillar 27 perpendicular to the photodiode 17 can be lead to the photodiode 17 so that an image with a satisfactory contrast can be obtained. In addition, since the pillar 27 is formed under the black matrix 23, the presence of the pillar 27 does not cause a black point on the display screen even though the color of the wall portion of the pillar 27 is black.

The color filter 22 includes filter portions for red, green, and blue lights. Each of the filter portions is assigned to one pixel, and is disposed to cover the corresponding reflective electrode 19. Furthermore, each filter portion is extended into an image inputting opening 28 adjacent to the corresponding pixel so as to be located over the pillar 27. Therefore, colored light corresponding to the filter portion formed over the pillar 27 is incident on the photodiode 17 through the pillar 27.

In this way, a color image input device including: the photodiode 17; the signal line 18; the shift register 14; the image processor 15; and the pillar 27 is incorporated in the display screen of the liquid crystal display apparatus.

Next, an example of a method for fabricating the liquid crystal display apparatus having the structure illustrated in FIG. 1 will be described with reference to FIGS. 2A to 2I and 3.

FIGS. 2A to 2I are cross-sectional views sequentially showing the respective process steps for fabricating the reflective color liquid crystal display apparatus illustrated in FIG. 1.

Figure 2A:
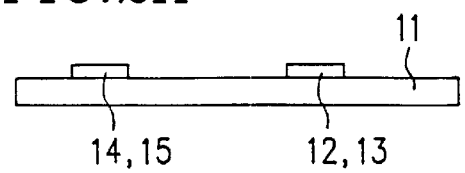
FIGS. 2A, 2B, 2C, 2D, 2E, 2F, 2G, 2H and 2I are cross-sectional views sequentially illustrating the process steps for fabricating the reflective color liquid crystal display apparatus illustrated in FIG. 1.

First, as shown in FIG. 2A, a semiconductor substrate 11, made of silicon (Si) or the like, is provided. The active device 12, the peripheral circuits thereof, the driver 13, the CCD shift register 14 functioning as a part of an image input device and the image processor 15 are formed on the semiconductor substrate 11 by performing a conventional IC process.

Figure 2F:
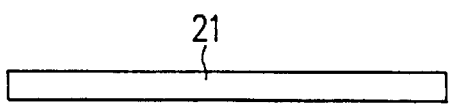
Figure 2B:
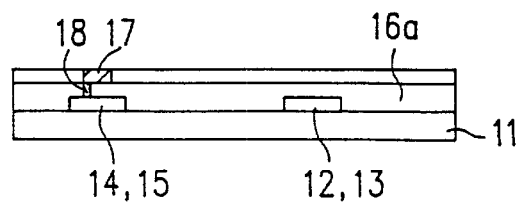

Next, as shown in FIG. 2B, an interlevel insulating film 16a is formed on the semiconductor substrate 11 to cover the above devices and circuits. Then, a photodiode 17, which functions as another part of the image input device, is formed on the interlevel insulating film 16a, after the insulating film 16a is flattened. The interlevel insulating film 16a may be formed by an atmospheric pressure chemical vapor deposition (APCVD) method, a plasma chemical vapor deposition (PCVD) method or the like. For flattening the insulating film 16a, a chemical mechanical polishing (CMP) method or the like may be used. In the present example, an $SiO_2$ film is used as the insulating film 16a and is formed to be about 500 nm thick by an APCVD method, and then the $SiO_2$ film is flattened by a CMP method.

Figure 3:
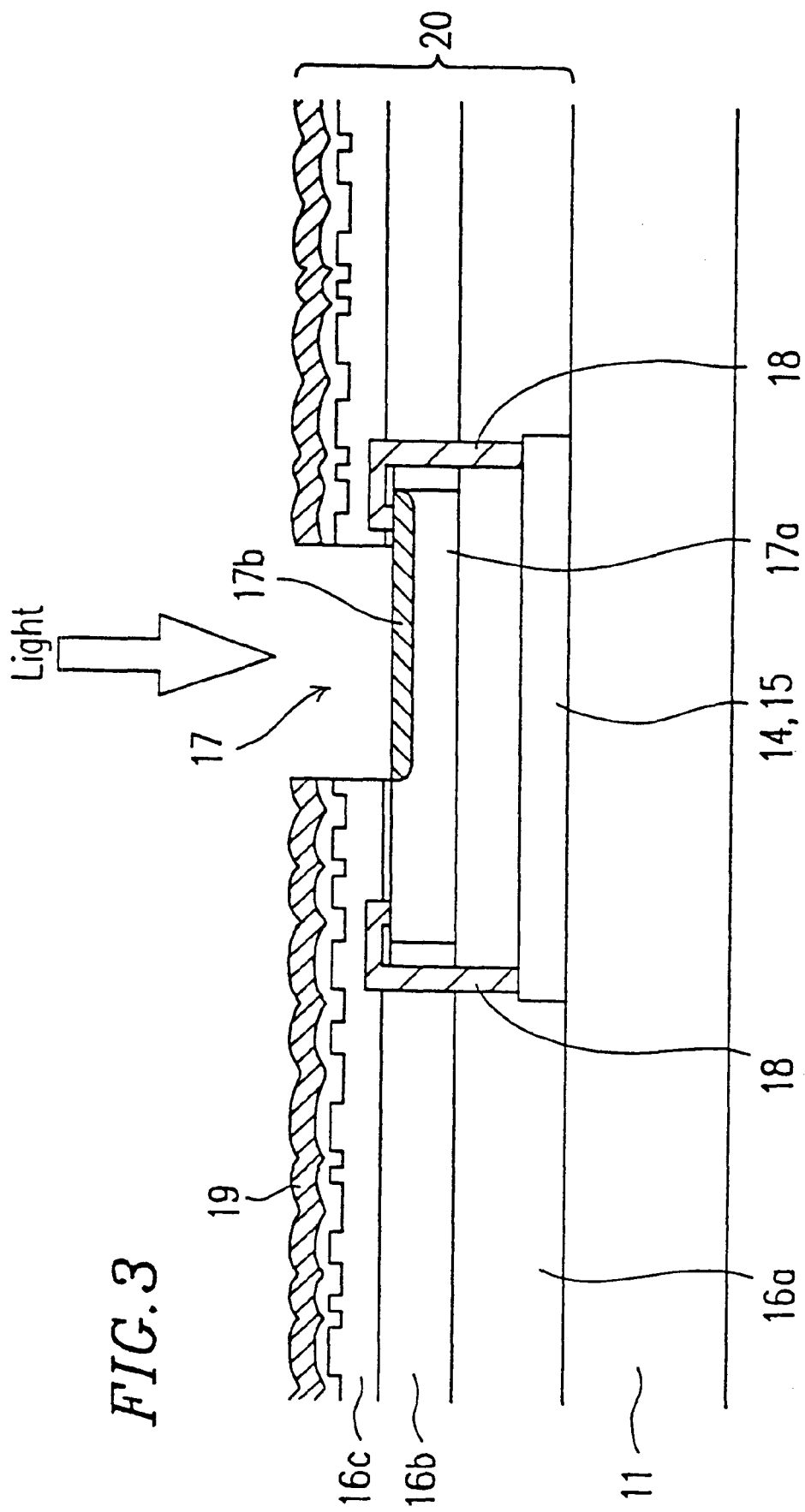
FIG. 3 an enlarged cross-sectional view of the photodiode 17 and the surrounding portions thereof illustrated in FIG. 1.

The photodiode 17 is formed in the following manner. First, as shown in FIG. 3, an $n^+$ amorphous Si film (hereinafter, simply referred to as $n^+$ a-Si film) 17a is deposited. In the present example, the $n^+$ a-Si film 17a having the thickness of 100 nm is deposited by performing a low-pressure chemical vapor deposition (LPCVD) method at a temperature within a range of approximately 200° C. to 300° C. Next, after the $n^+$ a-Si film 17a is patterned into an island shape by performing photolithography and etching, a $p^+$ a-Si portion 17b for forming a p-n junction is formed by executing an ion implantation method or a thermal diffusion method. The $n^+$ a-Si film 17a and the $p^+$ a-Si portion 17b constitute the photodiode 17 for converting light energy into a current or a voltage.

Then, as shown in FIG. 3, after another interlevel insulating film 16b is deposited over the photodiode 17, a contact hole for connecting the photodiode 17 to the CCD shift register 14 is formed by performing photolithography and etching. Thereafter, the signal line 18 for connecting the $n^+$ a-Si film 17a, the $p^+$ a-Si film 17b, the CCD shift register 14 and the image processor 15 is formed of metal. In the present example, an $SiO_2$ film having a thickness of 500 nm is formed as the interlevel insulating film 16b by way of a chemical vapor deposition (CVD) method. In addition, aluminum (Al) is used for the signal line 18.

Furthermore, the reflective electrode 19 is fabricated by a method disclosed in Japanese Laid-Open Patent Publication No. 6-75238.

More specifically, as shown in FIG. 3, a lower layer of an interlevel insulating film 16c, for example, made of a photosensitive acrylic resin, is formed on the substrate 11 as an underlying film of the reflective electrode 19. The surface of the lower layer is processed to have a dot pattern in which a number of protrusions are dispersed, by performing photolithography and etching. Then, edges of each protrusion is rounded by performing a heat treatment at a temperature within a range of approximately 120° C. to 250° C. Thereafter, an upper layer of the insulating film 16c is formed of, for example, photosensitive acrylic resin so that a flat portion between the protrusions is filled with the upper layer of the insulating film 16c. The resulting protrusions of the insulating film 16c are transmitted to the reflective electrode 19 formed on the insulating film 16c.

The height of the resultant protrusions of the insulating film 16c is adjusted by controlling the height of the protrusions formed by etching-the surface of the lower layer thereof. In the present example, the lower layer of the insulating film 16c is formed by applying the photosensitive acrylic resin on the substrate to have a thickness of about 2 $\mu$m, and the upper layer is formed to have a thickness of about 0.5 $\mu$m. In addition, the height of the protrusion formed by etching the surface of the lower layer is set to be 1 $\mu$m.

The interval between adjacent protrusions and the size of each protrusion are designed to suppress interference of light reflected by the reflective electrode 19 and to optimize the reflection characteristics of the reflective electrode 19 formed on the insulating film 16c, by filling the-flat portion between adjacent protrusions with the resin. In addition, since the uneven pattern in which the protrusions are dispersed is obtained by performing photolithography using a photo mask, the reflective electrode 19 can be formed with satisfactory reproducibility.

Figure 2C:
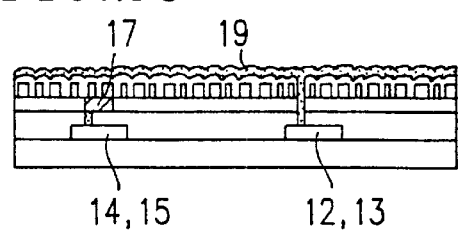

Then, as shown in FIG. 2C, after the contact hole for connecting the active device 12 of the device-formed substrate 20 with the reflective electrode 19 of the upper substrate part 25 is formed by performing photolithography and etching, a metal film made of Al, Ag or the like to be used as the reflective electrode 19 is formed on the interlevel insulating film 16c by employing a sputtering method or a deposition method. In the present example, an Al film having a thickness of about 1 $\mu$m is formed.

Figure 2D:
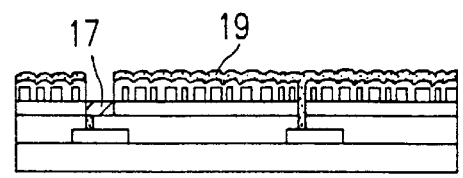

The metal film is patterned by performing photolithography and etching, thereby forming the reflective electrode 19. In the present example, the reflective electrodes 19 are arranged in a matrix in the display screen. The reflective electrode 19 is connected with the active device 12 via the contact hole. In addition, the interlevel insulating film 16c on the photodiode 17 is removed by etching simultaneously with the formation of the reflective electrode 19, as shown in FIG. 2D. As a result, the sensitivity of the photodiode 17 is improved. Also, each reflective electrode 19 functions as a light shielding film for preventing light other than light entering from the image inputting opening 28 from being incident onto the photodiode 17.

Each of the reflective electrodes 19 corresponds to one pixel, and the photodiodes 17 are disposed between portions of the adjacent reflective electrode 19, as shown in FIG. 1. Therefore, by providing the image inputting openings 28 in the black matrix 23 formed between adjacent pixels in each of which the reflective electrode 19 and the transparent counter electrode 24 overlap with each other, the photodiodes 17 can be disposed in the display screen without adversely affecting the display on the screen.

Figure 2G:
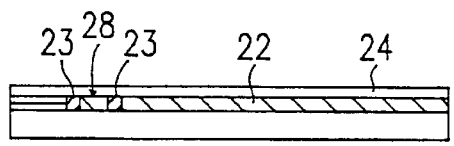
Figure 2E:
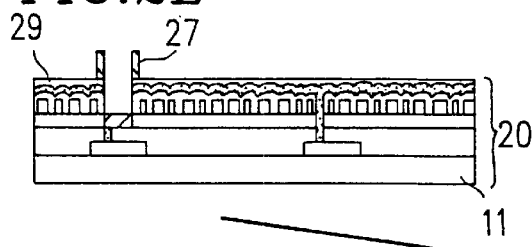
Figure 2H:
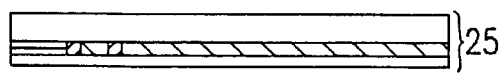

Next, as shown in FIG. 2E, an alignment film 29 is formed on the entire surface of the substrate 11. Then, an aligning treatment, such as a rubbing treatment, is performed with respect to the alignment film 29 for controlling orientation directions of liquid crystal molecules in the liquid crystal layer 26. As a material for the alignment film 29, a transparent polymer material such as polyimide can be used. In this example, a polyimide film is formed as the alignment film 29 on the substrate 11, and a horizontal alignment treatment is performed. After performing the aligning treatment, a portion of the alignment film 29 which is located on the photodiode 17 is removed by performing photolithography and etching.

Subsequently, as shown in FIG. 2E, the pillar 27 is formed above the photodiode 17 in the following manner.

First, the surface of the reflective electrode 19 of the device-formed substrate 20 is spin-coated with a UV curable polyimide resin with a black pigment dispersed therein. Next, only the polyimide resin located above edges of the photodiode 17 is cured by irradiating UV light and performing a photolithography method using a mask, and then the non-irradiated portions are removed by applying a solvent, thereby forming the wall portion of the pillar 27. In irradiation of the UV light, photomask is disposed on a portion of the polyimide resin which is located just above the photodiode 17 so as not to be cured, thereby the portion located just above the photodiode 17 remains uncured. As a result, only the wall portion of the pillar 27 can be cured and the inside of the pillar 27 can be processed to be hollow.

The height of the pillar 27 is set to be equal to a cell gap, i.e., a distance between the device-formed substrate 20 and the counter substrate 25 attached to each other, by controlling the thickness of the polyimide resin when the resin is applied. In the present example, the height of the pillar 27 is set to be 4 $\mu$m. Due to the pillar 27, image light entering from the image inputting opening 28 can reach the photodiode 17 without being obstructed by the surrounding liquid crystal layer.

In addition, since the pillar 27 is formed of a light absorbing material, such as a polymer material with a black pigment dispersed therein, all the components of the image light other than the components entering the pillar 27 perpendicular to the photodiode 17 will not be scattered but rather absorbed so that the photodiode 17 can detect only the components of the incoming light perpendicular thereto, and a signal having a satisfactory S/N ratio can be obtained.

In the fabrication process of the device-formed substrate 20 described above, all the process steps to be performed (after the devices 12 and 14, and the circuits 13 and 15 are formed on the semiconductor substrate 11 using an LSI fabrication technique) are performed at a temperature lower than 600° C. Therefore, the re-diffusion of the impurity is not caused in the devices formed using the LSI technique and the characteristics of such devices are not damaged by the production process steps following formation of such devices.

In addition, by using a semiconductor substrate in the device-formed substrate 20 of a reflective liquid crystal display apparatus, it is possible to form the active device 12, the driver 13, the CCD shift register 14 and the image processor 15, for example, by performing an LSI process, thereby improving the reliability thereof. Moreover, by monolithically forming the circuits such as driver 13 for driving the pixels and the image processor 15, on the same substrate, production costs can be reduced.

On the other hand, the counter substrate 25 is fabricated in the following manner.

First, as shown in FIGS. 2F and 2G, a transparent substrate is provided as the substrate 21 of the counter substrate 25. In the present example, a glass substrate having the thickness of 1.1 $\mu$m is employed as the substrate 21. Then, a color filter 22 having red filter portions, green filter portions and blue filter portions is formed on the substrate 21 by performing an electro-deposition method or a photolithography method. The color filter 22 is arranged so that each of the filter portions corresponds to one pixel.

Then, the black matrix 23 is formed over a portion of the transparent substrate 21 corresponding to a gap between the reflective electrodes 19. As shown in FIG. 1, the image inputting openings 28 are provided in the black matrix 23 to be respectively aligned with the photodiodes 17. The color filter 22 is also formed in the image inputting openings 28 so that each filter portion is disposed in an adjacent one of the openings 28. As a result, each of the openings 28 is assigned to any one of three colors, i.e., red, green or blue.

Therefore, through each of the openings 28, colored light of the corresponding color enters the pillar 27 to reach the photodiode 17. In this way, the photodiodes 17 obtain image signals corresponding to red light, green light and blue light. In the present example, the black matrix 23 is formed of the same material as the material for the pillar 27, i.e., the polymer material with a black pigment dispersed therein, and the size of each image inputting opening 28 is set to be 80 $\mu$m×80 $\mu$m.

Furthermore, a counter electrode 24 is formed of a transparent conductive material over the color filter 22 and the black matrix 23. In the present example, the counter electrode 24 is formed of ITO (Indium Tin Oxide) so as to be about 100 nm thick. Then, an alignment film is formed on the entire surface of the substrate 21 and is subjected to the aligning treatment. In the present example, the alignment film of the counter substrate 25 (see FIG. 2H) is formed of a transparent polyimide resin as well as the alignment film 29 of the device-formed substrate 20, and is subjected to a horizontal aligning treatment. In this way, the counter substrate 25 is completed.

Then, spacers (not shown) for maintaining a cell gap are dispersed over the device-formed substrate 20, while an adhesive seal member (not shown) is transferred on the counter substrate 25 so as to form a pattern. In the present example, spacers having a diameter of 4 $\mu$m, which is equal to the height of the pillar 27, are used.

Figure 2I:
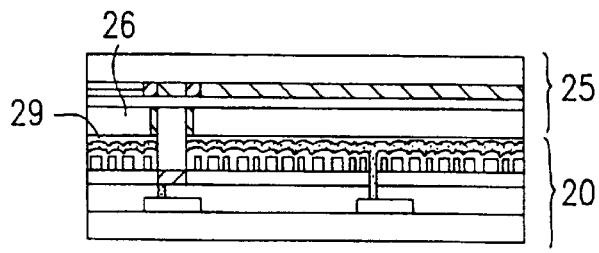

Next, as shown in FIG. 2I, the device-formed substrate 20 and the counter substrate 25 are attached to each other, while the reflective electrodes 19 are aligned with the filter sections of the color filter 22, and the pillars 27 are aligned with the image inputting openings 28 of the black matrix 23. Then, the gap between the attached substrates 20 and 25 is filled with a liquid crystal material, thereby completing the liquid crystal cell. In the present example, as the liquid crystal material, a phase-change type Guest-Host liquid crystal material (product name: ZLI2327 manufactured by Merck, Inc.) containing a black dye and being mixed with an optically active material (product name: S811 manufactured by Merck, Inc.) by a ratio of 4.5% is used, for example. That is, the liquid crystal display apparatus of the present example conducts display in the phase-change type Guest-Host mode and polarizers are not required for conducting display. Therefore, brighter display using all of light incident on the liquid crystal display apparatus.

Finally, by connecting the driver 13, the image processing section and the like, to external circuits, the liquid crystal display apparatus shown in FIG. 1 is completed.

In the liquid crystal display apparatus having the above-described structure, the input image is detected in the following manner.

As shown in FIG. 1, light carrying an image of an object is incident upon the display screen of the liquid crystal display apparatus, and then passes through the image inputting openings 28 provided in the black matrix 23 and the color filter 22 so as to be incident upon the photodiodes 17 through the pillars 27. Each of the photodiodes 17 receives corresponding color components of the incident light. All the components of the colored components entering the pillar 27, other than the components perpendicular to the photodiode 17, are absorbed by the wall portion of the pillar 27 without being scattered within the pillar 27 so that only the components perpendicular to the display screen are incident upon the photodiode 17.

Figure 4:
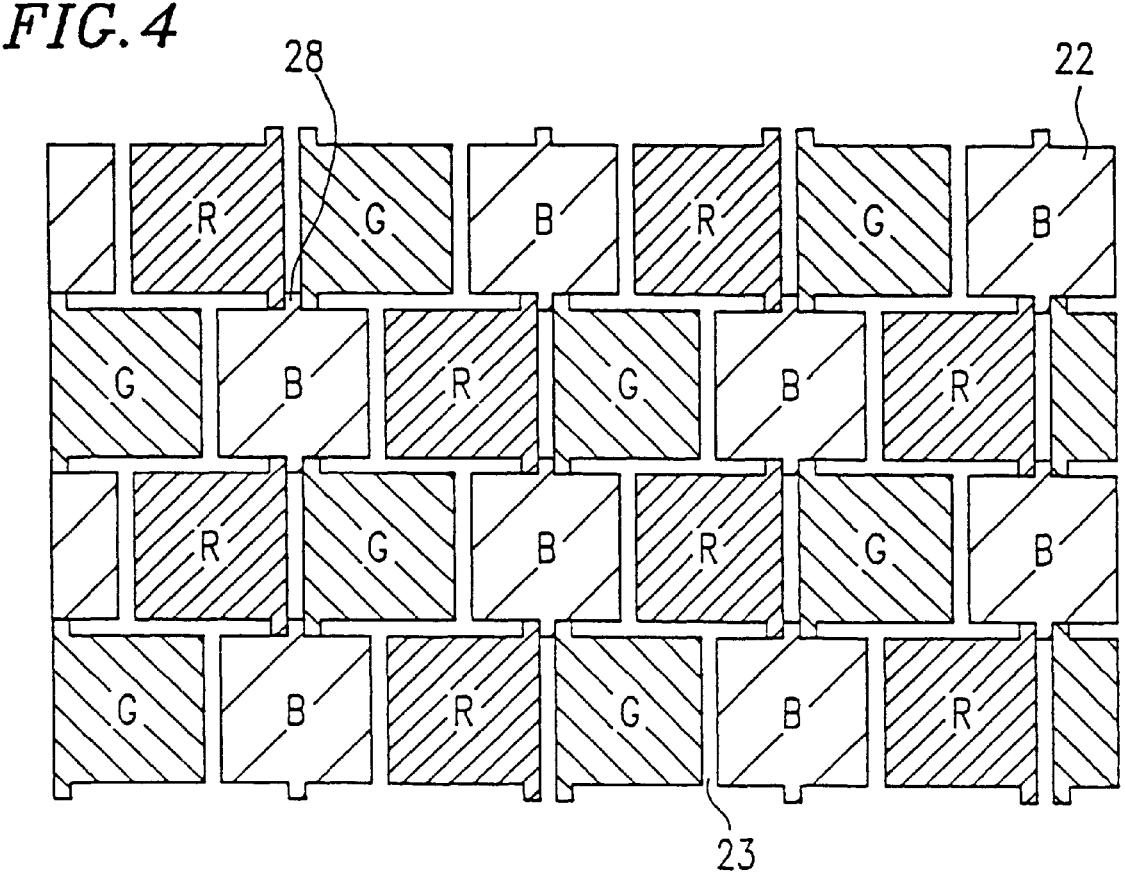
FIG. 4 a view illustrating the arrangement of light entering openings for the photodiodes and filter portions of the color filter in the reflective color liquid crystal display apparatus illustrated in FIG. 1.

In the liquid crystal display apparatus, a known color arrangement, for example, a delta arrangement as shown in FIG. 4, is employed for arranging the photodiodes 17 corresponding to red light, green light and blue light, i.e., arranging the red filter sections, the green filter sections and the blue filter sections of the color filter 22. In the case of employing the delta arrangement, it is possible to dispose the photosensitive portions of three image input devices, which respectively receive red light, green light, and blue light, on substantially the same position. Therefore, the deviation among a red image, a green image and a blue image, which constitute an input color image, due to the difference among the positions at which the red light, the green light and the blue light are detected can be reduced. Each photodiode 17 generates an image signal based on the corresponding colored light and transmits the image signal to the CCD shift register 14. The CCD shift register 14 transmits the image signal to the image processor 15, where the image signal is processed whereby an input image is obtained.

Figure 10:
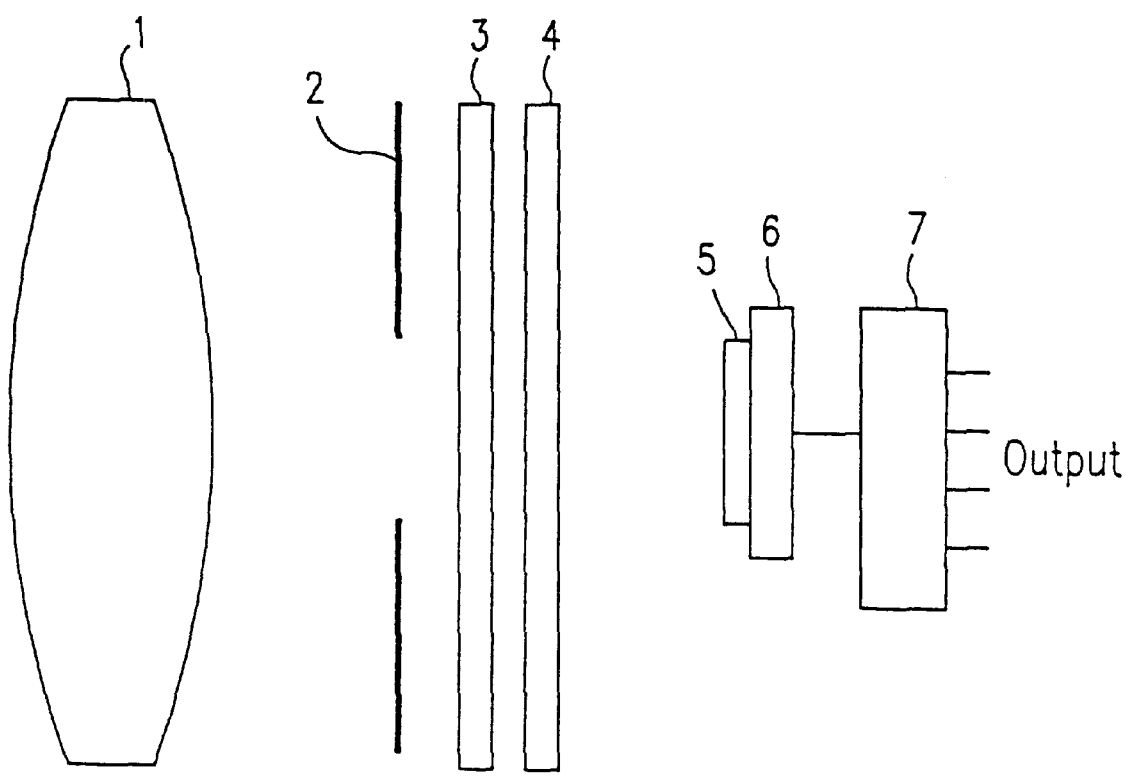
FIG. 10 is a view schematically illustrating the arrangement of a conventional camera using a CCD.

Although only a portion of the liquid crystal display apparatus corresponding to three pixels is shown in FIG. 1, the image of the object is input through the entire display screen where the pixels are provided in the liquid crystal display apparatus of the present example. This means that the image input devices are provided in the direction of the eyes of the user viewing the display screen. Therefore, in the case of using the liquid crystal display apparatus of the present example in bidirectional image communication, the eyes' direction of one user viewing the displayed image of the other user can coincide with that of the other user. In addition, since the entire display screen also functions as an image input surface of the image input device, the optical system as shown in FIG. 10, which is used in a camera section of a conventional bidirectional image communication device, is not required. This allows the image display section and the camera section (image input section) to be integrated, reducing the size and the weight of a bidirectional image communication device.

EXAMPLE 2

Figure 5:
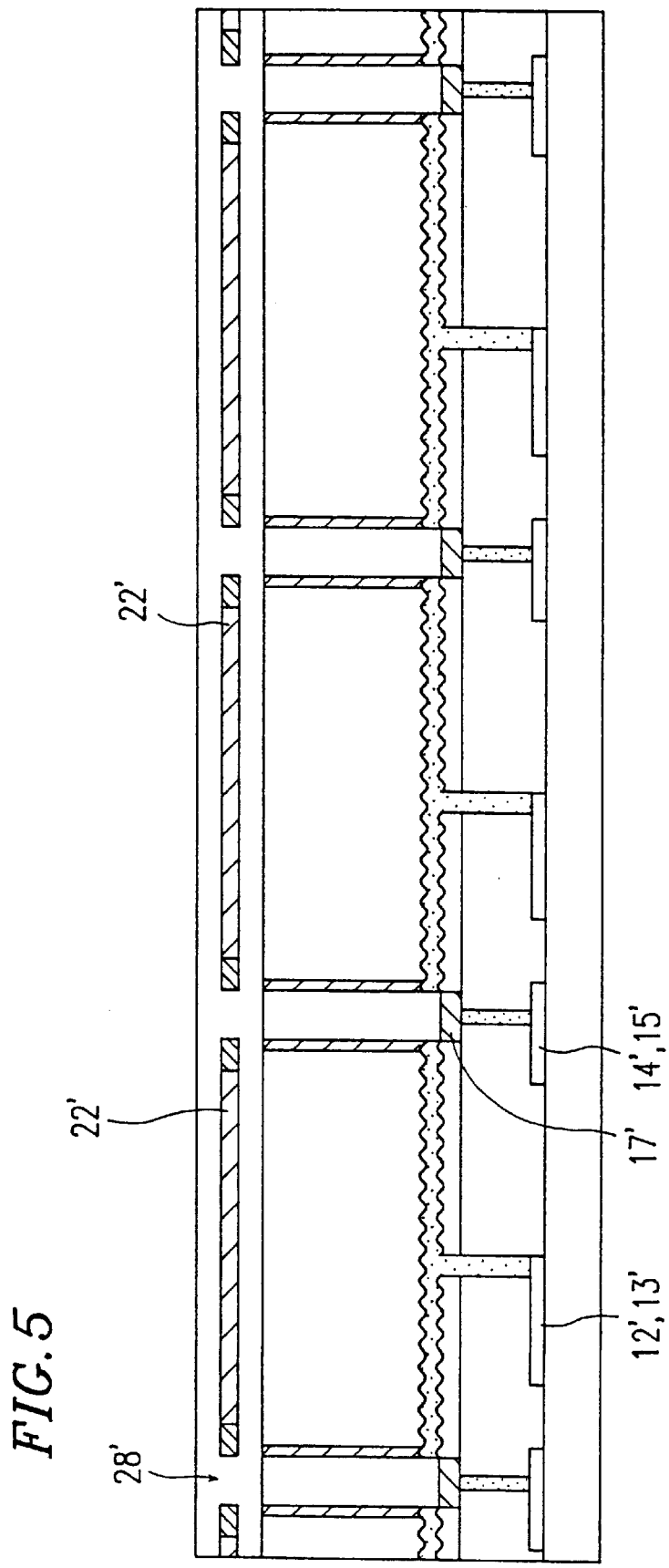
FIG. 5 is a cross-sectional view of a reflective liquid crystal display apparatus according to another embodiment of the present invention.

FIG. 5 is a cross-sectional view showing a liquid crystal display apparatus according to another embodiment of the present invention.

In this second example, the color filter 22' is not provided over the photodiodes 17' so that the obtained image becomes a monochrome one. Except for this point, the liquid crystal display apparatus has the same structure as that of Example 1, and therefore the detailed description of components of the liquid crystal display apparatus is omitted.

In the case where the color filter 22' is provided in the image inputting openings 28' so that each of the photodiodes 17' receives the corresponding colored components of incident image light, three photodiodes 17' receiving red light, green light and blue light, respectively make one set. That is, the resolution of the input image is one-third of the number of the photodiodes 17'. Therefore, in order to improve the resolution of the input image, it is necessary to increase the number of the photodiodes 17'. On the other hand, in the case where the color filter 22' is not provided over the photodiodes 17', as in the present example, it is true that the input image becomes monochrome. However, the resolution of the input image can be tripled compared to the case of color image input, if the number of the image input devices in the case of monochrome image input is equal to that of the image input devices in the case of the color image input. Therefore, the liquid crystal display apparatus of the present example is suitable for inputting an image with a higher resolution.

In Examples 1 and 2, a reflective liquid crystal display apparatus is fabricated by using a semiconductor substrate 11 and forming not only the active devices 12 for driving pixels but also the drivers 13 for supplying the display voltages to the active devices 12, the CCD shift registers 14 and the image processors 15 on the semiconductor substrate 11. Alternatively, a transmission type liquid crystal display apparatus including image input devices can also be obtained by using a transparent glass substrate in place of the semiconductor substrate 11. In this case, the active devices 12 and the photodiodes 17 are formed on the transparent glass substrate, while the circuits 13, 14 and 15 are provided as external IC circuits.

In addition, although the liquid crystal display apparatus conducts display in the phase-change type Guest-Host mode in Examples 1 and 2, the display mode is not limited thereto. In a liquid crystal display apparatus employing a light-scattering type display mode used for a polymer dispersed liquid crystal display apparatus, a birefringence display mode used for a ferroelectric liquid crystal display apparatus or the like, the above-mentioned effects can be obtained.

EXAMPLE 3

Figure 6:
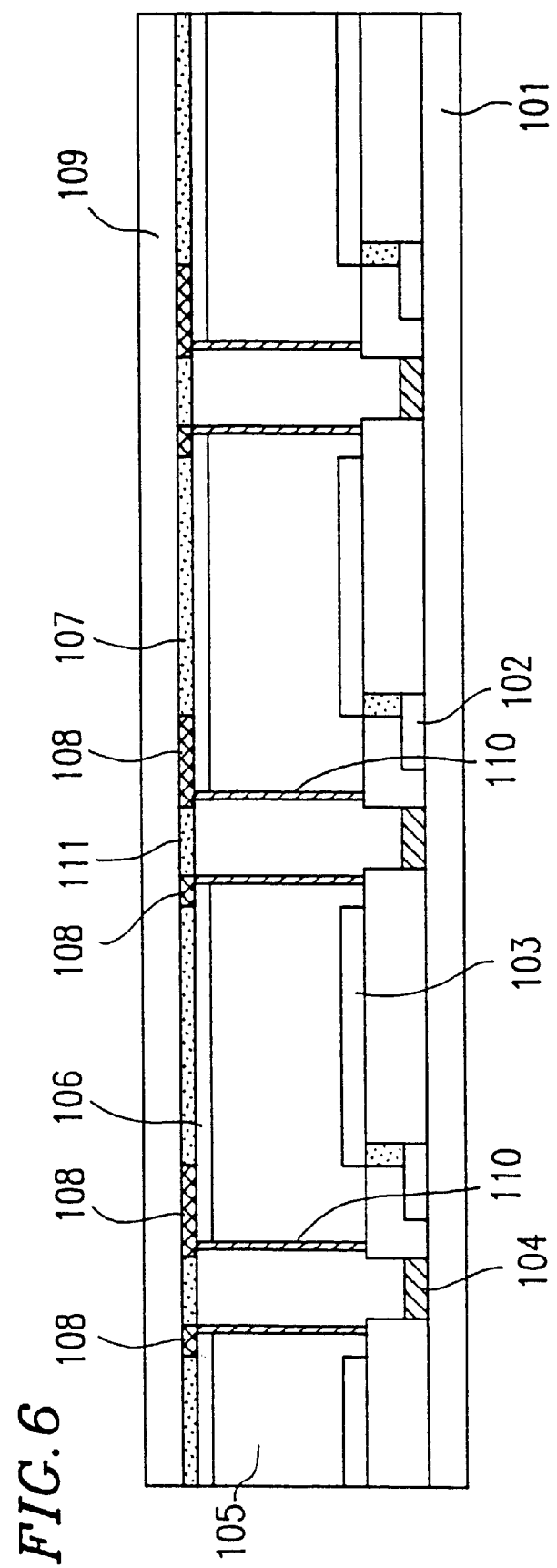
FIG. 6 is a cross-sectional view of a liquid crystal display apparatus according to still another embodiment of the present invention.

With reference to FIG. 6, a liquid crystal display apparatus according to the third example of the present invention will be described. In this example, the device-formed substrate includes a transparent substrate such as glass substrate, in place of a semiconductor substrate.

FIG. 6 is a cross-sectional view showing a transmissive color liquid crystal display apparatus. The liquid crystal display apparatus includes a device-formed substrate having a transparent insulating substrate 101, a counter substrate having a transparent insulating substrate 109, and a liquid crystal layer 105 interposed between the device-formed substrate and the counter substrate. In the liquid crystal display apparatus, a plurality of pixels are arranged in a matrix so as to constitute a display screen in which an image is actually presented.

On the transparent insulating substrate 101, such as a glass substrate, a plurality of pixel driving sections, each of which includes an active device 102 and a pixel electrode 103 connected to the active device 102, and a plurality of photodiodes 104, each functioning as a part of an image input device, are provided in the display screen. In the present example, one pixel driving section and one image input device are provided for each pixel. The pixel electrode 103 is used for applying a display voltage, which is supplied from the active device 102 to the liquid crystal layer 105 of the corresponding pixel so that optical properties of the liquid crystal layer 105 is changed. Each photodiode 104 is electrically connected to a shift register (not shown) which is implemented by a charge coupled device (CCD) via a signal line (not shown). The CCD shift register is formed on the periphery portion of the substrate 101 surrounding the display screen. The photodiode 104 and the CCD shift register constitute the image input device.

In addition, at least one driver circuit (not shown) for supplying display voltage to the active devices 102, and at least one image processors (not shown) for processing the input image from the image input devices in the display screen are provided on the peripheral portion of the substrate 101. The driver circuit and the image processor are connected to the active devices 102 and the shift registers, respectively. Furthermore, an alignment film (not shown) for controlling orientation directions of liquid crystal molecules in the liquid crystal layer 105 is formed on the entire surface of the substrate 101. The device-formed substrate is configured so as to include the above-mentioned components arranged in this manner.

The counter substrate include the transparent insulating substrate 109 on which a black matrix 108 having a plurality of image inputting openings 111, a color filter 107 having R filter sections for red light, G filter sections for green light and B filter sections for blue light, a transparent counter electrode 106 and an alignment film (not shown) are provided. Each of the filter sections are aligned with one pixel, so that each of the pixels is assigned any one color of red, green and blue. The counter substrate and the device-formed substrate having the above-mentioned structure are arranged so that the black matrix 108 corresponds to gaps between the pixel electrodes 103 and the image inputting openings 111 correspond, respectively, to the photodiodes 104, as shown in FIG. 6.

The liquid crystal display apparatus further includes a plurality of pillars 110 provided in the display screen. As shown in FIG. 6, each pillar 110 is arranged between the image inputting opening 111 and the corresponding photodiode 104 so that a wall portion of the pillar 110 is located under the black matrix 108, as in Examples 1 and 2. The pillar 111 is a hollow cylindrical member having a wall portion made of, for example, a polymer material. The inside of the pillar 110 is used as a passage way for directing image light, which is input through the image inputting opening 111, to the photodiodes 104 functioning as a photosensitive portion of the image input device. As the polymer material for the wall portion of the pillar 110, a light absorbing material, for example, a polymer material with a black pigment dispersed therein used for forming a black matrix is used. Therefore, components of the image light entering the pillar 110 which are incident on the wall portion of the pillar 110 are absorbed by the wall portion, thereby scattering of the image light within the pillar 110 is suppressed. As a result, only components of the image light which enter the pillar 110 perpendicular to the photodiode 104 can be directed to the photodiode 104, so that the input image can be satisfactory contrast.

The wall portion of each of the pillars 110 are arranged under the black matrix 108, as described above. Therefore, although the pillars 110 are provided within the display screen, they do not occur in a displayed image as black points. In addition, the color filter 107 is extended so that the each filter section is also disposed in one the image inputting opening 111 which is adjacent to the corresponding pixel. Therefore, the photodiode 104 can receive colored light in accordance with the color of the filter section. In this way, color image input can be conducted by the liquid crystal display apparatus of the present example.

Next, an example of the method for fabricating the liquid crystal display apparatus having the structure shown in FIG. 6 will be described.

In the present example, in order to provide high performance image input devices on the substrate having poor heat resistance, such as a glass substrate, the image input devices including semiconductor devices are fabricated on a semiconductor substrate which is not included in the liquid crystal display apparatus, and are then transferred from the semiconductor substrate onto the transparent substrate 101 of the device-formed substrate. The technique for fabricating the semiconductor devices on the semiconductor substrate and then transferring them onto the glass substrate is proposed by, for example, J. P. Salerno et al. in SID '92 Digest, pp. 63–66.

More specifically, first, a single-crystalline Si film is epitaxially formed on a single-crystalline Si wafer with an insulating film provided therebetween. Then, the image input devices are formed using the single-crystalline Si film on the single-crystalline Si wafer. Also, other circuits and devices of a liquid crystal display apparatus, such as active devices and driver circuits, and the image processor may be formed on the single-crystalline Si wafer in the similar way to the image input devices. Subsequently, thus formed circuits and devices are transferred onto the substrate to be used in the device-formed substrate, thereby the liquid crystal display apparatus including the active devices and the circuits using the single-crystalline Si film is completed. As the active devices using the single-crystalline Si film, thin film transistors may be formed, for example.

Referring to FIGS. 7A to 7G, a fabrication process of the liquid crystal display apparatus shown in FIG. 6 will be described.

An insulating film 113 is formed on a single-crystalline Si substrate 112, as shown in FIG. 7A. In the present example, the insulating film 113 is formed by performing a heat treatment at a temperature of 900° C. so as to have the thickness of 1 μm. Then, a portion of the insulating film 113 is removed so as to expose a portion of the surface of the single-crystalline Si substrate 112 in the vicinity of an end portion thereof, and thereafter a polysilicon film 114 and a cap film 115 made of, for example, $SiO_2$ are formed in this order. In the present example, the polysilicon film 114 and the cap $SiO_2$ film 115 are formed to be about 3000 Å and 3000 Å, respectively.

Then, the surface of the substrate 112 is scanned in a direction indicated by an arrow in FIG. 7B by a heater 116 including a heat filament while being heated, so that the polysilicon film 114 is recrystallized. In other words, using single-crystalline Si existed in the exposed portion of the substrate 112 as a nucleus, a lateral epitaxial growth of single-crystalline Si is performed, thereby obtaining a single-crystalline Si film. After recrystallization, the cap film 115 is removed by etching.

Next, as shown in FIG. 7C, the semiconductor devices constituting the image input devices, such as the photodiodes 104, are formed using the single-crystalline Si film formed on the insulating film 113, by a known LSI fabrication process. The temperature during the formation of the semiconductor devices is not limited, because the semiconductor devices are formed on the single-crystalline Si substrate. Thus, the semiconductor devices with a high performance and a high reliability can be obtained. In this step, the image input devices each including the photodiode 104 and the CCD shift register (not shown), and the image processor (not shown) are formed.

In addition, the active devices 102 for driving the pixels and the driver circuit (not shown) for supplying the display voltages to the active devices 102 may be formed using the single-crystalline Si film formed on the insulating film 113, simultaneously with the image input devices and the image processor, as shown in FIG. 7C. In this case, a liquid crystal display apparatus with higher performance and higher resolution can be realized. Among the above-described devices and circuits, the photodiodes 104 and the active devices 102 are provided so that they are arranged in the display screen after being transferred onto the substrate actually used in the liquid crystal display, while the CCD shift registers and the image processor (both not shown) are arranged in a portion surrounding the portion where the photodiodes 104 and the active devices 102 are provided. The photodiodes 104 and the active devices 102 are respectively connected to the shift registers and the driver circuit via wirings (not shown) arranged in a matrix. In the present example, thin film transistors are used as the active devices 102.

Next, a protective layer and an adhesive layer are formed on the substrate 112 to cover the above-mentioned semiconductor devices in this order, and the glass substrate 101 is attached to the adhesive layer. Then, the semiconductor substrate 112 is removed by performing an etching of the substrate 112 from the side opposite to the insulating film 113, a chemical mechanical polish (CMP) method or the like. In this way, the semiconductor devices formed on the semiconductor substrate 112 are transferred to the glass substrate 101, as shown in FIG. 7D.

By performing the above-mentioned steps, the active devices 102 using the single-crystalline Si film, the driver circuit thereof, the image input devices including the photodiodes 104 and the CCD shift registers, and the image processor are formed on the transparent insulating substrate 101.

Next, contact holes are formed in the insulating film 113 to reach drain portions of the thin film transistors 102, and metal lines 117 made of, for example, aluminum (Al), are formed to be respectively connected to the drain portions are formed. Then, a transparent conductive film made of, for example, ITO (Indium Tin Oxide) is formed on the entire surface of the substrate 101 by a known method, such as a sputtering method, and is patterned to form a plurality of pixel electrodes 103 arranged in a matrix by a known method. Subsequently, portions of the insulating film 113 located above the photodiodes 104 are removed in order to improve the photosensitivity of the photodiodes 104, as shown in FIG. 7E.

Then, an alignment film (not shown) is formed on the entire surface of the substrate 101 using a polymer material, such as polyimide, and thereafter the alignment film is subjected to an aligning treatment. In the present example, a TN mode is used as the display mode, in which the alignment films are rubbed so that the rubbing direction thereof are at a right angle. After the aligning treatment, portions of the alignment film located above the photodiodes 104 by photolithography and etching.

Next, as shown in FIG. 7F, hollow pillars 110 are formed above the photodiodes 104. First, the substrate 101 is spin-coated with a UV curable light absorbing material, for example, a polyimide resin including a black pigment therein. Then, only portions of the UV curable light absorbing layer to form the wall portions of the pillars 110 are cured by irradiation of UV light using a photomask. Non-irradiated portions of the UV curable light absorbing layer are removed by a solvent, thereby the pillars 110 as hollow cylindrical members are obtained. In the irradiation of UV light, the photomask is disposed so that portions of the light absorbing layer located above the photodiodes 104 are not irradiated. In this way, the device-formed substrate is completed.

The height of the pillars 110 can be set to be equal to a cell gap (i.e., a distance between the device-formed substrate and the counter substrate) by adjusting the thickness of the light absorbing layer when it is applied on the substrate 101. In the present example, the height of the pillars 110 are 4 $\mu$m. Owing to the pillars 110, image light input through the image inputting openings 111 can be incident on the photodiodes 104 without being adversely effected by the liquid crystal layer 105. Among the components of the image light, only the components entering the pillars 110 perpendicular to the photodiodes 104 can reach the photodiodes 104, while the remaining components are absorbed by the wall portions of the pillars 110 without being scattered. Since the photodiodes 104 detect only the components entering the pillars 110 perpendicular to the photodiodes 104, signals with a satisfactory S/N ratio are obtained.

On the other hand, the counter substrate is fabricated in the following manner.

First, a color filter 107 is formed on a transparent insulating substrate 109 by performing an electro-deposition method or a photolithography method. In the present example, a glass substrate having the thickness of 1.1 $\mu$m is used as the substrate 109. The color filter 107 includes red filter sections, green filter sections and blue filter sections. Each filter section is assigned to one pixel. The color filter 107 is disposed so that each of the filter sections faces a corresponding pixel electrode 103 when the counter substrate is attached to the device-formed substrate to form a cell.

Then, a black matrix 108 is formed of a light absorbing material on the substrate 109 so that the black matrix 108 corresponds to gaps between the pixel electrodes 103 when the counter substrate and the device-formed substrate are formed. As the light absorbing material for the black matrix 108, a polymer material with a black pigment dispersed therein may be used. The black matrix 108 includes image inputting openings 111 formed therein, as shown in FIG. 6. The image inputting openings 111 are arranged to correspond to the photodiodes 104, respectively, when the counter substrate and the device-formed substrate are attached. The color filter 107 is extended to be disposed in the openings 111, so that each opening 111 is assigned to any one color of red, green and blue. Therefore, each of the photodiodes 104 can receive the colored components of the image light in accordance with the color of the corresponding filter section.

Next, a transparent conductive film, such as an ITO film, is formed on the substrate 109 by, for example, sputtering, and is patterned to form a counter electrode 106. In the present example, the counter electrode 106 is formed to be about 100 nm thick. Then, an alignment film (not shown) is formed on the substrate 109 in the same way as the alignment film of the device-formed substrate. By performing an aligning treatment, the counter substrate is completed.

The device-formed substrate and the counter substrate fabricated, as described above, are attached to each other to form a cell, after spacers (not shown) for maintaining a cell gap are dispersed on the device-formed substrate and an adhesive seal member (not shown) is transferred on the counter substrate. The device-formed substrate and the counter substrate are arranged so that pixel electrodes 103 are positionally aligned with the filter sections of the color filter 107 and the pillars 110 are positionally aligned with the openings 111 in the black matrix 108. In the present example, spacers having a diameter of 4 μm, which is equal to the height of the pillars 110, are used.

Subsequently, the cell is filled with a liquid crystal material to form a liquid crystal layer 105. A twisted nematic type liquid crystal material for an active matrix liquid crystal display apparatus is used for forming the liquid crystal layer 105. In the present example, a liquid crystal material ZLI-4792 manufactured by Merck, Inc. is used. After the liquid crystal layer 105 is formed, the circuits provided on the peripheral portion of the substrate 101, such as the driver circuit for the active devices 102 and the image processor, are electrically connected to an external circuit. Then, a pair of polarizers (not shown) are disposed to sandwich the liquid crystal cell, and a backlight (not shown) is disposed behind the device-formed substrate. In this way, the transmissive liquid crystal display apparatus shown in FIG. 6 is completed.

In the liquid crystal display apparatus of the present example, the input image is detected in the following manner.

First, as shown in FIG. 6, light carrying an image of an object is incident upon the display screen of the liquid crystal display apparatus, and then passes through the image inputting openings 111 provided in the black matrix 108 and the color filter 107 so as to be incident upon the photodiodes 104 via the pillars 110. Each of the photodiodes 104 receives the components of the incident light of the corresponding color. All the components of the colored components entering the pillar 110, other than the components perpendicular to the photodiode 104, are absorbed by the wall portion of the pillar 110 without being scattered in the inside of the pillar 110 so that only the components perpendicular to the display screen are incident onto the photodiode 104.

In the liquid crystal display apparatus, a known color arrangement, for example, a delta arrangement as shown in FIG. 4, is employed for arranging the photodiodes 104 corresponding to red light, green light and blue light, i.e., arranging the red filter sections, the green filter sections and the blue filter sections of the color filter 107. In the case of employing the delta arrangement, it is possible to dispose the photosensitive portions of three image input devices, which respectively receive red light, green light and blue light, on substantially the same position. Therefore, the deviation among a red image, a green image and a blue image, which constitute an input color image, due to the difference among the positions at which the red light, the green light and the blue light are detected can be reduced. Each photodiode 104 generates an image signal based on the corresponding colored light and transmits the image signal to the CCD shift register (not shown) formed on the peripheral portion of the substrate 101 of the device-formed substrate. The CCD shift register transmits the image signal to the image processor (not shown), where the image signal is processed whereby an input image is obtained.

Although only a portion of the liquid crystal display apparatus corresponding to three pixels is shown in FIG. 6, the image of the object is input through the entire display screen where the pixels are provided in the liquid crystal display apparatus of the present example. This means that the image input devices are provided in the direction of the eyes of the user viewing the display screen. Therefore, in the case of using the liquid crystal display apparatus of the present example in bidirectional image communication, the eyes' direction of one user viewing the displayed image of the other user can coincide with that of the other user. In addition, since the entire display screen also functions as an image input surface of the image input device, the optical system as shown in FIG. 10, which is used in a camera section of a conventional bidirectional image communication device, is not required. This allows the image display section and the camera section (image input section) to be integrated, reducing the size and the weight of a bidirectional image communication device.

Figure 8:
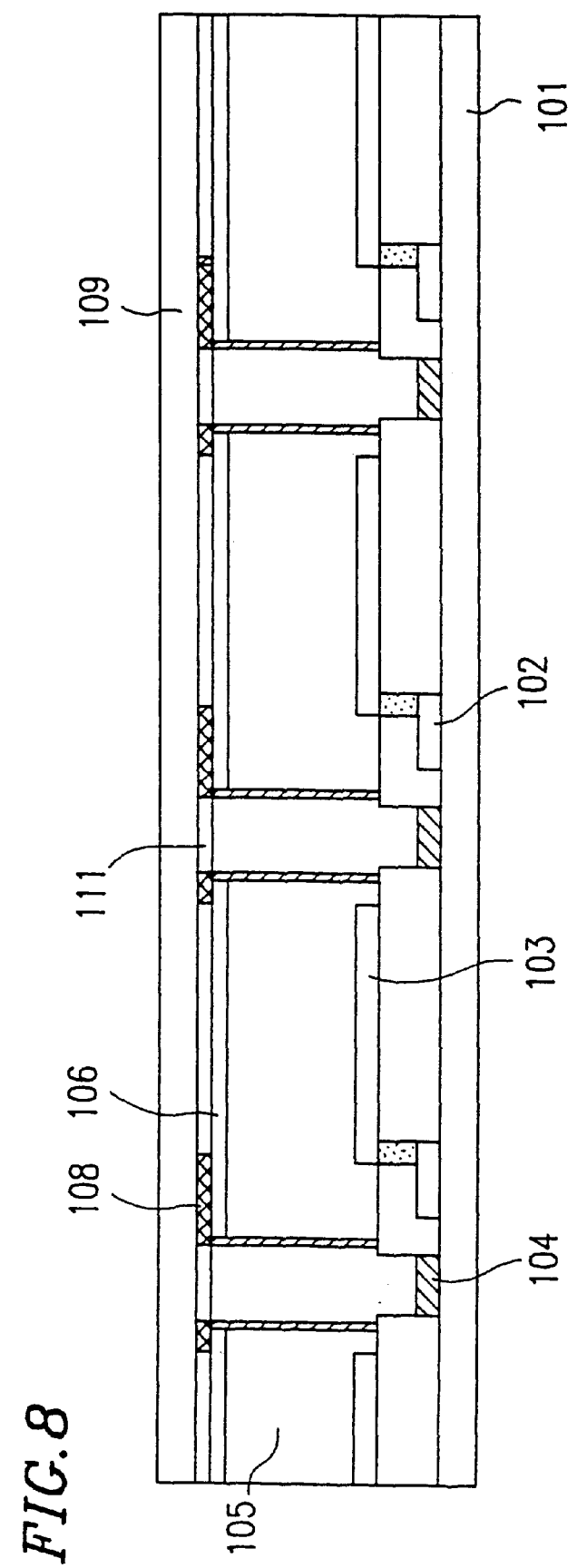
FIG. 8 is cross-sectional view of a liquid crystal display apparatus according to a modification of the liquid crystal display apparatus illustrated in FIG. 6.

Next, a liquid crystal display apparatus according to a modification of Example 3 will be described with reference to FIG. 8. In this modification, the color filter 107 is not disposed in the image inputting openings 111. Therefore, monochrome image is obtained as the input image. Except for this point, the liquid crystal display apparatus has the same structure as that of Example 3, and therefore the detailed description of components of the liquid crystal display apparatus is omitted.

In the case where the color filter 107 is provided in the image inputting openings 111 so that each of the photodiodes 104 receives the corresponding colored components of incident image light, three photodiodes 104 corresponding to different colors make one set. That is, the resolution of the input image is one-third of the number of the photodiodes 104. Therefore, in order to improve the resolution of the input image, it is necessary to increase the number of the photodiodes 104. On the other hand, in the case where the color filter 107 is not provided over the photodiodes 104, as in the present example, it is true that the input image becomes monochrome. However, the resolution of the input image can be tripled compared to the case of color image input, if the number of the image input devices in the case of monochrome image input is equal to that of the image input devices in the case of the color image input. Therefore, the liquid crystal display apparatus of the present example is suitable for inputting an image with a higher resolution.

Figure 9:
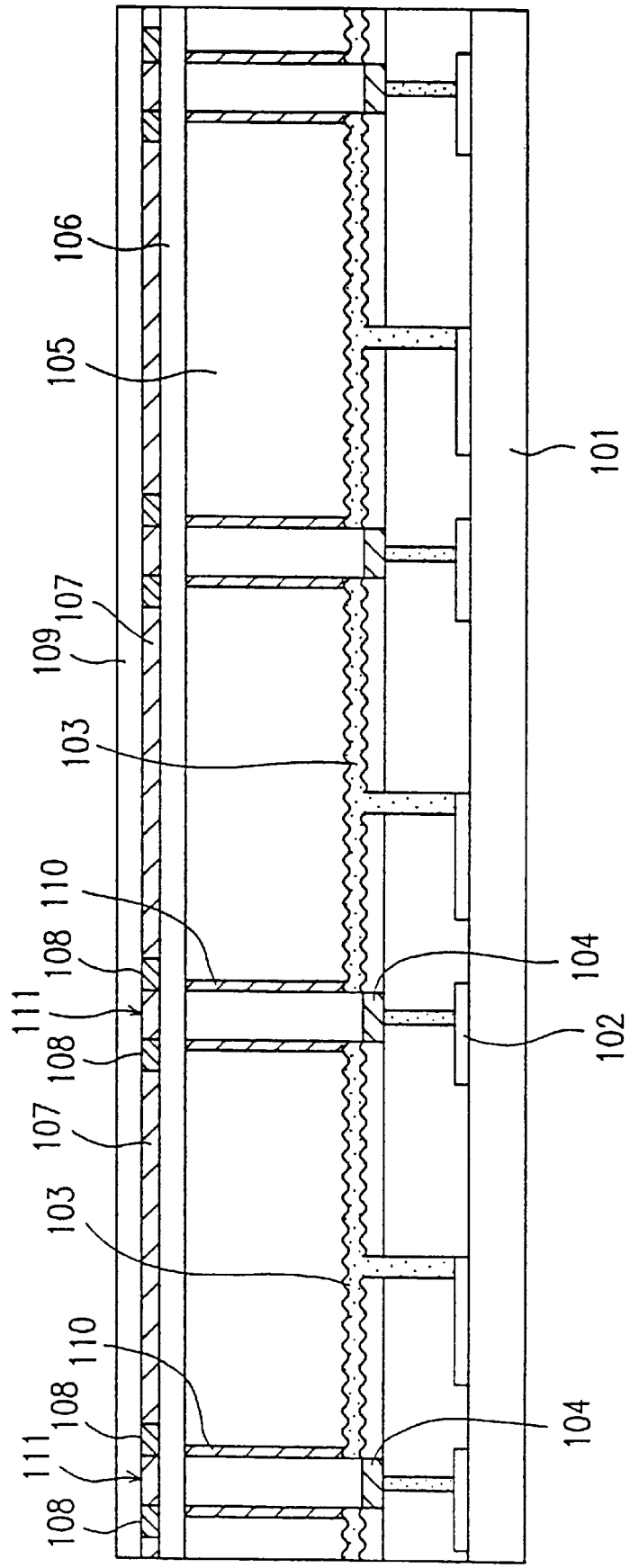
FIG. 9 is a cross-sectional view of a liquid crystal display apparatus according to another modification of the liquid crystal display apparatus illustrated in FIG. 6.

Next, a liquid crystal display apparatus according to another modification of Example 3 will be described with reference to FIG. 9. In this modification, the pixel electrodes 103 are formed of a metal film to function as reflective electrodes. Accordingly, the backlight is not required. As a material for the reflective electrodes, aluminum (Al), silver (Ag), nickel (Ni), chromium (Cr) or gold (Au) may be used. In addition, a transparent substrate included in the device-formed substrate may be either transparent or opaque. Except for this point, the liquid crystal display apparatus has the same structure as that of Example 3, and therefore the detailed description of components of the liquid crystal display apparatus is omitted.

In the reflective liquid crystal display apparatus of this modification, the active devices 102, the driver circuit connected thereto, the image input devices including the photodiodes 104 and the shift registers, and the image processor connected to the image input devices are formed on a semiconductor substrate which is not used in the liquid crystal display apparatus, and are then transferred onto the substrate 101 of the device-formed substrate. Therefore, the temperature during the fabrication process of the above-mentioned devices and circuits is not limited, allowing a substrate made of a resin which is light and inexpensive to be used in place of a glass substrate. In this modification, the liquid crystal display apparatus is fabricated by similar process described in Example 3, using a substrate of an opaque resin as the substrate 101 of the device-formed substrate.

As described above, according to this modification, a liquid crystal display apparatus, which has lighter weight, smaller size and which is cheap and excellent in resistance to an impact compared to a liquid crystal display apparatus using the glass substrate, can be obtained.

As is apparent from the foregoing description, since at least part of the image input device is incorporated in the display screen in the liquid crystal display apparatus according to the present invention, the liquid crystal display apparatus can perform both the image display and the image input. Therefore, it is possible to form a compact and light-weight display apparatus having the image input function. In addition, at least the photosensitive portions of the image input devices are arranged in the viewing direction of the user viewing the displayed image in the liquid crystal display apparatus of the present invention, it is possible to input an image of the user in which the direction of the eyes thereof coincides with the direction of the other user whose image is displayed on the display screen, in bidirectional image communication.

Moreover, according to the present invention, by forming the active devices, the driver circuit, the image input devices and the image processor on a semiconductor substrate and then transferring them onto a substrate which is actually used in the liquid crystal display apparatus. Therefore, the temperature during the fabrication process of the above-mentioned devices and circuits is not limited. Accordingly, a known LSI fabrication process can be used for forming the above-mentioned devices and circuits, improving the reliability and performance of the device and circuits.

Furthermore, by using a semiconductor substrate in the device-formed substrate and monolithically forming the circuits, such as the driver circuit and the image processor on the semiconductor substrate, the production cost of the liquid crystal display apparatus can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus including:
   a device-formed substrate,
   a counter substrate,
   a liquid crystal layer interposed therebetween,
   wherein the device-formed substrate comprises:
      a plurality of display electrodes for applying display voltages to the liquid crystal layer;
      a plurality of active devices connected to the plurality of display electrodes,
   wherein the counter substrate comprises:
      a counter electrode provided opposite to the display electrode; and
      a black matrix disposed on a portion of the counter substrate which corresponds to a portion between the display electrodes,
   image inputting devices on the device-formed substrate for inputting an image, an image processor provided for processing the image input by the image inputting devices,
      openings provided on a portion of the black matrix on the counter substrate which corresponds to a portion of the image inputting devices, and
      cylindrical members being disposed between the openings and the light inputting devices.

2. A liquid crystal display apparatus according to claim 1, wherein the image inputting devices include light receiving portions and charge coupled devices electrically connected to the light receiving portions, respectively, the light receiving portions being arranged to be located in the vicinity of the display electrodes.

3. A liquid crystal display apparatus according to claim 2, wherein the device-formed substrate includes a substrate on which the active devices, the image inputting devices and the image processor are disposed and an insulating film formed on the active devices and the image processor and the insulating film formed around at least a portion of the image inputting devices, and
   wherein the display electrodes and the light receiving portions of the image inputting devices are disposed on the insulating film, and
   wherein the display electrodes are connected to the active devices through contact holes provided in the insulating film, and the light receiving portions of the image inputting devices are connected to the charge couple devices through contact holes provided in the insulating film.

4. A liquid crystal display apparatus according to claim 3, wherein the plurality of display electrodes are arranged in a matrix, and
   wherein the counter substrate includes a further substrate, a counter electrode formed on the further substrate, and a black matrix disposed on a portion of the further substrate which corresponds to a portion between the display electrodes, the black matrix having openings, the light receiving portions of the image inputting devices being arrange to align with the openings of the black matrix.

5. A liquid crystal apparatus according to claim 4, wherein the counter substrate further includes a color filter, part of the color filter being formed in the openings of the black matrix.

6. A liquid crystal apparatus according to claim 1, wherein the device-formed substrate includes a semiconductor substrate, and at least the active devices and the image inputting devices are monolithically disposed on the semiconductor substrate.

7. A liquid crystal display apparatus according to claim 3, wherein the device-formed substrate includes a semiconductor substrate, and a driving circuit is provided for supplying the display voltages to the active devices on the semiconductor substrate.

8. A liquid crystal display apparatus according to claim 1, wherein the plurality of display electrodes are reflective electrodes formed of a light-reflective material, and the image processing means are disposed on the device-formed substrate.

9. A liquid crystal display apparatus according to claim 1, wherein the device-formed substrate includes a transparent substrate, the active devices and the image inputting devices are disposed on the the transparent substrate, and the plurality of display electrodes are formed of a transparent material.

10. A liquid crystal display apparatus according to claim 9, further comprising a backlight disposed on one side of the device-formed substrate opposite to the liquid crystal layer, and wherein the image processor are formed on the device-formed substrate.

11. A liquid crystal display apparatus according to claim 9, wherein the image inputting devices are semiconductor devices which are fabricated on a semiconductor substrate and are then transferred on the transparent substrate.

12. A liquid crystal display apparatus for bi-directionally communicating image information comprising:
   a device-formed substrate;
   a counter substrate;
   a liquid crystal layer interposed therebetween; and
   wherein the device-formed substrate includes:

a plurality of display elements arranged in a matrix for displaying a first image, each of the plurality of display elements comprising an active device for respectively supplying display voltages to the display element;

a plurality of image inputting elements provided in correspondence with each of the plurality of display elements for receiving light of a second image;

a processor for processing the inputted second image; and cylindrical members disposed between openings provided on the counter substrate and the image inputting elements.

13. A liquid crystal apparatus according to claim 1, wherein the image inputting devices include:

light receiving portions being arranged to align with the black matrix;

charge coupled devices electrically connected to the light receiving portions; and wherein the light receiving portions are arranged to be located in the vicinity of the display electrodes.

14. A liquid crystal apparatus according to claim 1, wherein the counter substrate further includes a color filter disposed on a portion of the counter substrate that corresponds to a portion of the display electrodes, part of the color filter being formed in the openings.

15. A liquid crystal apparatus including a device-formed substrate, a counter substrate, and a liquid crystal layer interposed therebetween, the device-formed substrate comprising:

a plurality of display electrodes arranged in a matrix for applying display voltages to the liquid crystal layer;

a plurality of active devices for supplying the display voltages to the plurality of display electrodes respectively;

image inputting devices for inputting an image, wherein the image inputting devices including light receiving portions and charge coupled devices electrically connected to the light receiving portions, respectively, the light receiving portions being arranged to be located in the vicinity of the display electrodes;

image processing means for processing the image input by the image inputting devices;

a substrate on which the active devices, the image inputting devices and the image processing means are disposed and an insulating film formed on the active devices and the image processing means, and the insulating film formed around at least a portion of the image inputting devices;

wherein the display electrodes and the light receiving portion of the image inputting devices are disposed on the insulting film;

wherein the display electrodes are connected to the active devices through contact holes provided in the insulating film, and the light receiving portions of the image inputting devices are connected to the charge couple devices through contact holes provided in the insulting film;

the counter substrate comprising a further substrate, a counter electrode formed on the further substrate, and a black matrix disposed on a portion of the further substrate which corresponds to a portion between the display electrodes the black matrix having openings, the light receiving portions of image inputting devices being arranged to align with the openings of the black matrix; and cylindrical members disposed between the openings and the light receiving portions of the image inputting devices, each of the cylindrical members being a hollow member having a wall-portion formed of a light absorbing material.

16. A liquid crystal display apparatus according to claim 1, wherein the cylindrical member is a hollow member having a wall-portion formed of a light absorbing material.

17. A liquid crystal display apparatus according to claim 12, wherein the cylindrical member is a hollow member having a wall-portion formed of a light absorbing material.

18. A liquid crystal display apparatus including:

a device-formed substrate;

a counter substrate;

a liquid crystal layer interposed therebetween;

wherein the device-formed substrate comprises:

a plurality of display electrodes for applying display voltages to the liquid crystal layer, a plurality of active devices connected to the plurality of display electrodes, image inputting devices on the device-formed substrate for inputting an image, an image processor provided for processing the image input by the time inputting devices, and cylindrical members disposed between openings provided on the counter substrate and the image inputting devices; and wherein th e device-formed substrate includes a semiconductor substrate, and at least the active devices and the image inputting devices are disposed on the semiconductor substrate.

19. A liquid crystal apparatus according to claim 18, wherein the device-formed substrate is a semiconductor substrate, the plurality of display electrodes are refractive electrodes formed of a light-refractive material, and a driving circuit and the image processor are provided for supplying the display voltages to the active devices on the semiconductor substrate.

20. A liquid crystal display apparatus including:

a device-formed substrate;

a counter substrate;

a liquid crystal layer interposed therebetween;

wherein the device-formed substrate comprises:

a plurality of display electrodes for applying display voltages to the liquid crystal layer, a plurality of active devices connected to the plurality of display electrodes, image inputting devices on the device-formed substrate for inputting an image, an image processor provided for processing the image input by the image inputting devices, and cylindrical members disposed between openings provided on the counter substrate and the image inputting devices; and wherein the device-formed substrate is a transparent substrate, and the active devices, the image inputting devices and the image processor are characterized that each components fabricated on the semiconductor substrate are transferred on the transparent substrate.

* * * * *